(12) United States Patent  (10) Patent No.: US 7,838,782 B2
Hamilton et al.  (45) Date of Patent: Nov. 23, 2010

(54) INTEGRATED AIRCRAFT SCALE AND LEVELING APPARATUS AND METHODS FOR USE

(75) Inventors: Edward C Hamilton, Amarillo, TX (US); Michael A. Greene, Canyon, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 41 days.

(21) Appl. No.: 12/088,976

(22) PCT Filed: Oct. 5, 2006

(86) PCT No.: PCT/US2006/038979

§ 371 (c)(1),
(2), (4) Date: Apr. 2, 2008

(87) PCT Pub. No.: WO2007/044467

PCT Pub. Date: Apr. 19, 2007

(65) Prior Publication Data

US 2008/0257611 A1 Oct. 23, 2008

(51) Int. Cl.
*G01G 19/02* (2006.01)
*G01G 19/07* (2006.01)
(52) U.S. Cl. .............. 177/132; 177/146; 187/210; 187/216; 187/403; 254/89 R; 414/426
(58) Field of Classification Search .......... 187/403, 187/210, 216; 254/89 R; 414/426; 177/145, 177/146, 132–134; 73/65.05
See application file for complete search history.

(56) References Cited

U.S. PATENT DOCUMENTS 1,381,592 A * 6/1921 Price ................. 254/89 R

| 2,477,854 | A | * | 8/1949 | Baker | 177/146 |
| 2,754,107 | A | * | 7/1956 | Ernst et al. | 177/211 |
| 2,806,686 | A | * | 9/1957 | Miller, Jr. | 177/146 |
| 2,819,612 | A | * | 1/1958 | Borgstrom et al. | 73/65.05 |
| 3,119,598 | A | * | 1/1964 | Petersen | 254/93 R |
| 3,164,218 | A | * | 1/1965 | McClimon | 177/134 |
| 3,252,532 | A | * | 5/1966 | Richards | 177/255 |
| 3,581,836 | A | * | 6/1971 | Segerdahl et al. | 177/1 |

(Continued)

FOREIGN PATENT DOCUMENTS

GB      1267276      3/1972

(Continued)

OTHER PUBLICATIONS

Chinese Office Action dated Jul. 28, 2010 from counterpart Chinese Patent Application 200680037365.5.

*Primary Examiner*—Randy W Gibson
(74) *Attorney, Agent, or Firm*—James E. Walton; Richard G. Eldredge (57) ABSTRACT

A combination apparatus for weighing an aircraft has a plurality of weight scales, each scale being adapted to be supported by a support surface in a position for receiving landing gear of an aircraft thereon. At least one riser supports at least one scale above the support surface, and the height of each riser is selected to position an aircraft on the scales in a level attitude while a weight of the aircraft is being supported by the landing gear on the scales. At least one scale may be recessed in the support surface, and the height of each riser may be adjustable.

25 Claims, 9 Drawing Sheets

U.S. PATENT DOCUMENTS

| | | | | |
|---|---|---|---|---|
| 3,587,760 | A * | 6/1971 | Puhringer et al. | 177/141 |
| 3,603,417 | A * | 9/1971 | Wachholz | 177/126 |
| 3,949,822 | A * | 4/1976 | English et al. | 177/126 |
| 4,137,977 | A * | 2/1979 | Alger | 177/146 |
| 4,203,497 | A * | 5/1980 | Harris et al. | 177/134 |
| 4,576,539 | A * | 3/1986 | Williams | 187/200 |
| 4,589,507 | A * | 5/1986 | Curran | 177/138 |
| 4,673,048 | A * | 6/1987 | Curran | 177/146 |
| 4,708,319 | A * | 11/1987 | Cruz | 254/45 |
| 4,889,202 | A * | 12/1989 | Bron | 177/134 |
| 4,935,885 | A | 6/1990 | McHale | |
| 4,992,775 | A * | 2/1991 | Castle et al. | 340/525 |
| 5,004,093 | A * | 4/1991 | Blezard | 198/430 |
| 5,646,376 | A * | 7/1997 | Kroll et al. | 177/211 |
| 5,739,477 | A * | 4/1998 | Queen | 177/126 |
| 5,973,274 | A * | 10/1999 | Zarchy | 177/132 |
| 6,096,983 | A * | 8/2000 | Ozaki et al. | 177/52 |
| 6,177,638 | B1 * | 1/2001 | Murray | 177/133 |
| 6,357,989 | B1 * | 3/2002 | Iles | 414/428 |
| 6,380,496 | B1 * | 4/2002 | Lohkamp | 177/144 |
| 6,420,666 | B1 * | 7/2002 | Baumeler et al. | 177/145 |
| 6,452,118 | B1 * | 9/2002 | van Pinxteren et al. | 177/145 |
| 6,603,081 | B2 * | 8/2003 | Luchinger | 177/126 |
| 6,608,262 | B1 * | 8/2003 | Eiswerth et al. | 177/146 |
| 6,627,826 | B2 * | 9/2003 | Cavina et al. | 177/145 |
| 6,717,072 | B1 * | 4/2004 | Winterberg et al. | 177/126 |
| 6,800,818 | B2 * | 10/2004 | Balboni et al. | 177/52 |
| 6,881,907 | B2 * | 4/2005 | Winkelmolen | 177/145 |
| 7,511,234 | B1 * | 3/2009 | Ebinger | 177/132 |
| 2005/0092975 | A1 * | 5/2005 | Tarra | 254/122 |

FOREIGN PATENT DOCUMENTS

| | | |
|---|---|---|
| SU | 386265 A1 | 9/1973 |
| WO | WO 95/02167 A1 | 9/1973 |

* cited by examiner

INTEGRATED AIRCRAFT SCALE AND LEVELING APPARATUS AND METHODS FOR USE

TECHNICAL FIELD

The present invention relates generally to integrated scales and leveling mechanisms for use with aircraft and, more specifically, to an apparatus and method for providing aircraft weight and balance procedures.

DESCRIPTION OF THE PRIOR ART

Prior-art devices use aircraft jacks and loads cells to jack, level, and weigh aircraft. These devices are dependant upon use of large aircraft jacks and procedures that involve some amount of risk when jacking the aircraft. In addition, the load cells, when used in conjunction with aircraft jacks, can be subject to erroneous readings during to side loading of the load cells. Furthermore, these methods are not always acceptable, particularly for military aircraft.

Other prior-art devices use floor scales and electromechanical or hydraulic rams to measure the weight of the aircraft from the wheels. These electromechanical or hydraulic rams are used to place the aircraft in a level condition that is required for the weight and balance procedures and calculating the aircraft center of gravity. The problem with these systems is that the ram systems used to level the aircraft are normally fixed into one location of a facility making "spontaneous" facility-independent weight and balance procedures near impossible. The ram systems also require significant foundation work and pits in the floor that can trap flammable gases that are present in aircraft hangar operations. These pits must include specially designed ventilation systems to evacuate these gases.

Although great strides have been made in the area of aircraft weight and balance procedures, many shortcomings remain.

SUMMARY OF THE INVENTION

There is a need for apparatus and methods for obtaining a level weight measurement of an aircraft while the weight of the aircraft is on its wheels.

Therefore, it is an object of the present invention to provide apparatus and methods for obtaining a level weight measurement of an aircraft while the weight of the aircraft is on its wheels.

A combination apparatus for weighing an aircraft has a plurality of weight scales, each scale being adapted to be supported by a support surface in a position for receiving landing gear of an aircraft thereon. At least one riser supports at least one scale above the support surface, and the height of each riser is selected to position an aircraft on the scales in a level attitude while a weight of the aircraft is being supported by the landing gear on the scales. At least one scale may be recessed in the support surface, and the height of each riser may be adjustable. The present invention provides for several advantages, including: (1) providing apparatus that allows the user to simultaneously level and weigh an aircraft; (2) providing mobile apparatus to eliminate the need for a dedicated site; and (3) providing improved methods for leveling and weighing an aircraft.

BRIEF DESCRIPTION OF THE DRAWINGS

For a more complete understanding of the present invention, including its features and advantages, reference is now made to the detailed description of the invention taken in conjunction with the accompanying drawings, in which.

DESCRIPTION OF THE PREFERRED EMBODIMENT

The present invention provides for low-profile floor scales with integral leveling capabilities and methods for use thereof. The present invention may be used on all models of wheeled aircraft, such as helicopters, fixed-wing aircraft, tiltrotor aircraft, and other wheeled aircraft. The invention is particularly useful for aircraft that sit in a non-level attitude when the weight of the aircraft is on the wheels (the "weight on wheels" condition). In addition, or as an alternative, the present invention may also be used as a portable mechanism to weigh and balance any large "naturally" non-level items. Leveling may be done for each wheel independently. The apparatus and methods shown and described a safe, economical, and facility-independent solution of performing aircraft weight and balance procedures. In addition, the benefits and advantages of the present invention provide for low cost, low maintenance, and the flexibility to be used on any level surface.

Figure 1:
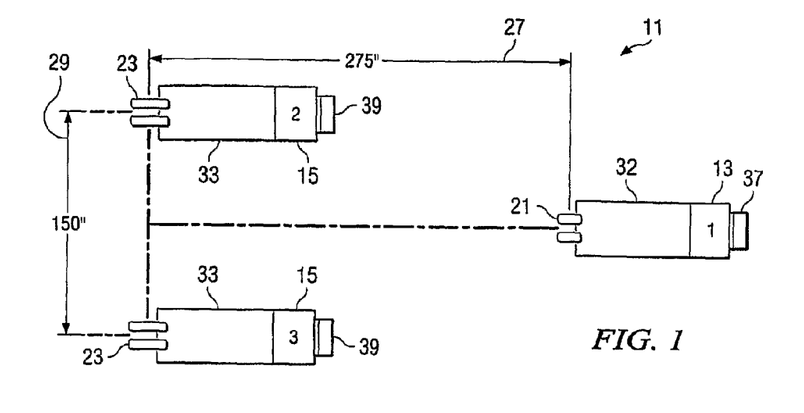
FIG. 1 is a top view of a scale configuration of the method according to the present invention.
Figure 2:
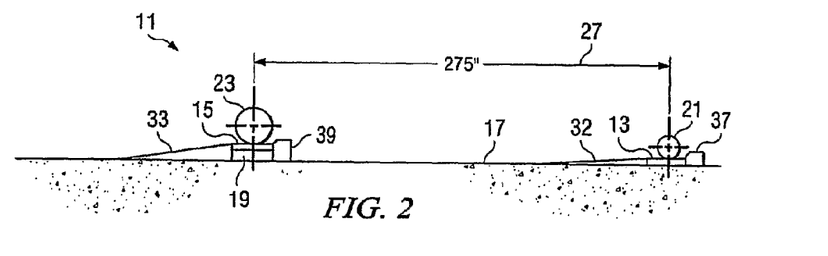
FIG. 2 is a side view of the scale configuration of FIG. 1.
Figure 3:
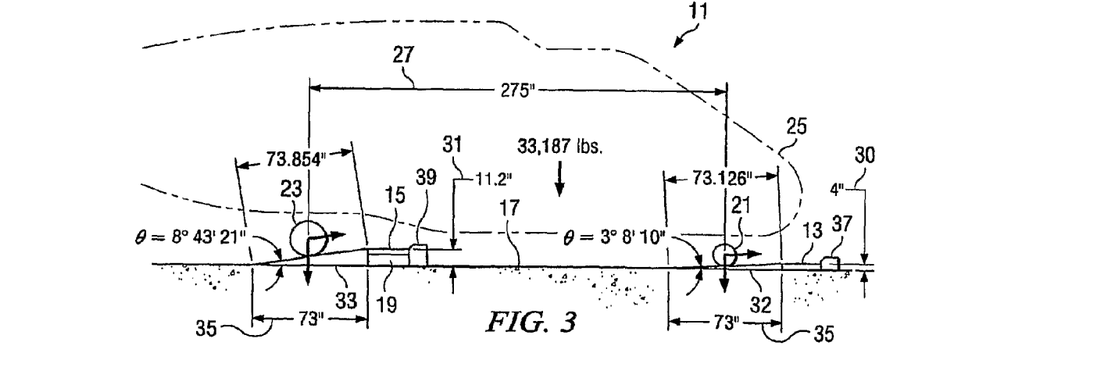
FIG. 3 is a side view force diagram of the scale configuration of FIG. 1.

Referring to FIGS. 1 through 3, example scale configuration 11 is shown configured for use with "off-the-shelf" aircraft scales, such as the AC30-60 Platform Scale, which is produced by Intercomp Company of Minneapolis, Minn. In addition, scale configuration 11 is shown configured for use with a particular aircraft, which in this case is an EH101 helicopter. The tire diameters are 16.5 in for the nose gear and 25.5 in. for the main gear, and the aircraft weight is 33,187 lbs. The wheelbase is 275 in., and the width between the two sets of main gear wheels (track) is 150 in. In the "weight on wheels" condition, the EH 101 sits with a 1.5° nose-up attitude. The EH101 is used as the example aircraft for all specific configurations and methods described herein, though the apparatus and methods of the invention are equally applicable to other aircraft.

Scale configuration 11 comprises a nose gear scale 13 and two main gear scales 15. Scales 13, 15 are flat scales adapted for positioning on a flat surface, such as floor 17. Nose gear scale 13 rests on floor 17, whereas main gear scales 15 are supported above an approximately level floor 17 on risers 19. Risers 19 may be formed as a non-adjustable or adjustable rigid structure or may alternatively be one of other types, such as airbags, which may also provide for adjustability or the height of risers 19. Scales 13, 15 and risers 19 are positioned on floor 17 so that nose landing gear 21 and main landing gear 23 will simultaneously rest on scales 13, 15 when helicopter 25 (shown in broken lines in FIG. 3) is rolled onto scales 13, 15. For use with the EH 101 helicopter, wheelbase measurement 27 is 275 in. and track measurement 29 is 150 in.

Scales 13, 15 each have a vertical thickness 30 of 4 in., and risers 19 have a vertical thickness of 7.2 in, which provides for a total height 31 of 11.2 in. This configuration lifts the main gear 15 above nose gear 13 by the height of risers 19, which lifts the rear portion of helicopter 25 to eliminate the 1.5° nose-up attitude of helicopter 25 and put helicopter 25 in a level attitude relative to floor 17. To allow for helicopter to easily be moved onto scales 13, 15, a nose gear ramp 32 is located adjacent scale 13, and a main gear ramp 33 is located adjacent each scale 15. Helicopter 25 is rolled onto scales 13, 15 by rolling landing gear 21, 23 onto ramps 32, 33. As shown in FIG. 3, ramps 32, 33 create angled surfaces for landing gear 21, 23 to roll up and onto scales 13, 15. In the embodiment shown, ramps 32, 33 have a length 35 of 73 in. To prevent landing gear 21, 23 from rolling off the front of scales 13, 15, chocks 37, 39 are positioned adjacent scales 13, 15, respectively, opposite ramps 32, 33.

To measure the weight of helicopter 25, helicopter 25 is rolled up ramps 32, 33 and onto scales 13, 15, the measurements of which may be read individually at scales 13, 15 or may be read together on a central readout connected to scales 13, 15. The advantage of using risers 19 is that the rear of helicopter 25 will be lifted, so as to put helicopter 25 in a level attitude relative to floor 17, and this provides for accurate weight measurement.

When using rigid risers 19, it should be noted that risers 19 have a height chosen for use with particular aircraft, in that an aircraft having a different "weight on wheels" attitude will require rigid risers 19 having different heights and may require a riser 19 under nose gear scale 13. Even when using correctly sized risers 19, the aircraft may only be placed in an approximately level orientation, with the orientation having a front-to-rear and/or side-to-side error. The present invention provides for apparatus capable of further refining the attitude of the aircraft through fine adjustment, and these apparatus are described below.

Referring to FIGS. 4 through 8, scale configuration 41 also comprises nose gear scale 13 and main gear scales 15. However, in scale configuration 41 nose gear scale 13 is recessed in a cavity 43 formed in floor 17, and main gear scales 15 are supported above an approximately level floor 17 on risers 45. As shown in cross-section in FIG. 6, cavity 43 is a generally rectangular recess formed in floor 17, cavity having a depth 47 of 4 in. for positioning the upper surface of scale 13 in alignment with the surface of floor 17. When scale 13 is removed from cavity 43, a cover, such as cover 49 of FIG. 7, may be inserted into cavity 43 to provide a generally uninterrupted surface of floor 17.

Figure 4:
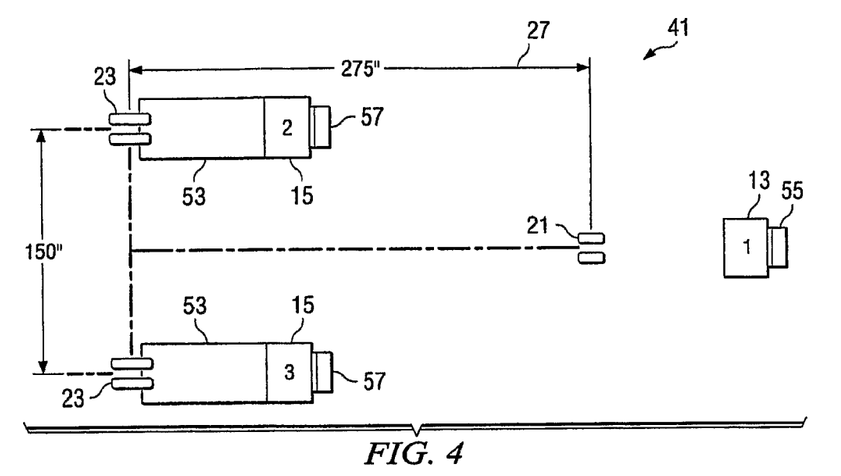
FIG. 4 is a top view of a scale configuration of an alternative method according to the present invention.
Figure 5:
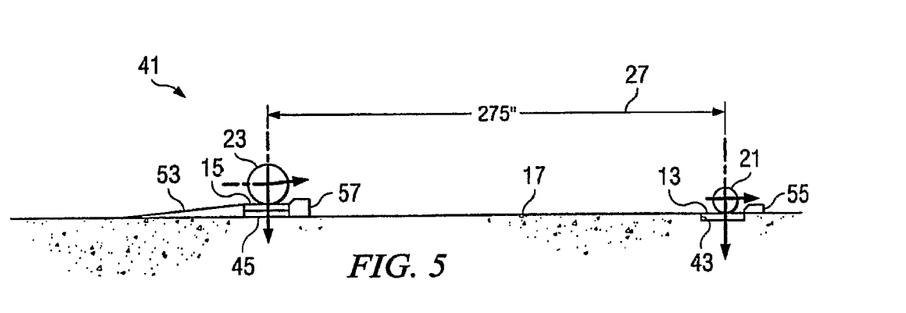
FIG. 5 is a side view of the scale configuration of FIG. 4.
Figure 6:
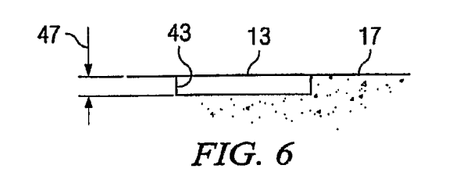
FIG. 6 is a cross-section view of the scale cavity of FIG. 5.
Figure 7:
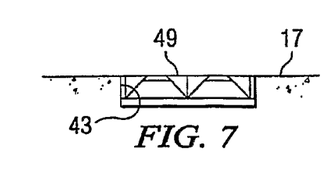
FIG. 7 is a cross-section view of the scale cover of FIG. 5.
Figure 8:
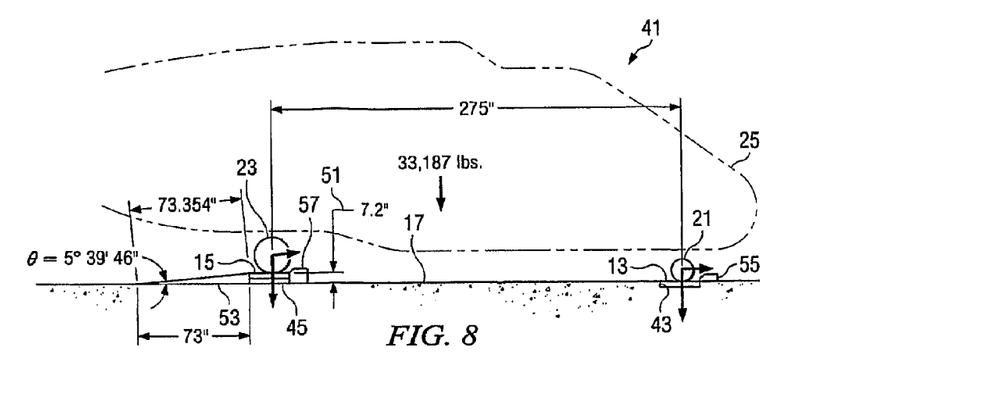
FIG. 8 is a side view force diagram of the scale configuration of FIG. 4.

To provide for elimination of the nose-up attitude of helicopter 25, risers 45 have a height of 3.2 in., which provides for a total height 51 of 7.2 in. As in the scale configuration 11, a ramp 53 is used to roll main gear 23 onto scales 15. However, because nose gear scale 13 is recessed into floor 17, no ramp is necessary for rolling nose gear 21 onto scale 13. Chocks 55, 57 are used to prevent helicopter 25 from rolling forward and off of scales 13, 15.

In operation, scales are located in scale configuration 11 or configuration 41, and an aircraft is then towed up the ramps and onto scales 13, 15. To ensure that the weight measurements are accurate, it is desirable to take a first measurement, roll the aircraft off of scales 13, 15, and then roll the aircraft back onto scales 13, 15. In fact, it is desirable to perform three measurements to ensure accuracy. However, with the apparatus shown in FIGS. 1 through 8, the weight of the aircraft is not removed from scales 13, 15 until the aircraft is moved onto the ramps. This is undesirable, as the weight of the aircraft urges the aircraft down the ramps, requiring a tow vehicle, or other source of towing force, to hold the aircraft in position to be moved back onto scales 13, 15.

Figure 9:
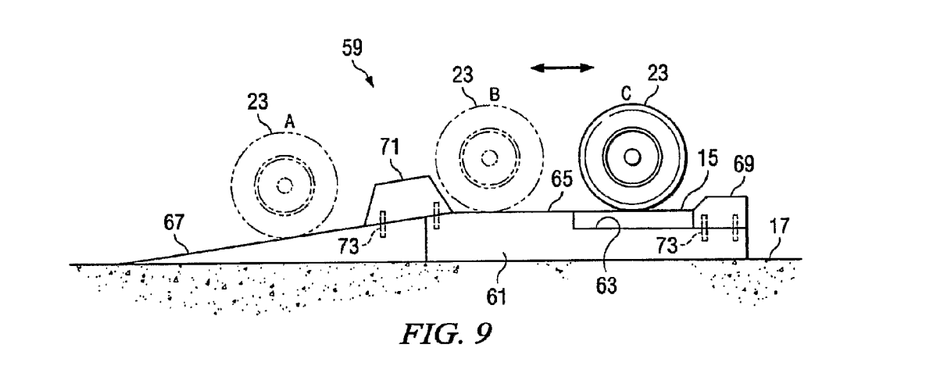
FIG. 9 is a side view of an alternative embodiment of an apparatus according to the present invention.

FIG. 9 shows an alternative embodiment of a scale assembly. Assembly 59 comprises a scale 15 and a riser 61, riser 61 having being longer than risers 19, 45 described above. Riser 61 rests on floor 17 and has a recessed surface 63 on a forward portion of riser 61. Scale 15 is located on surface 63, which places an upper surface of scale 15 at approximately the same level as upper surface 65 of riser 61. A ramp 67 is located adjacent a rear portion of riser 61, and chocks 69, 71 are fastened at the front and rear, respectively, of riser 61 with fasteners 73. When installed, chocks 69, 71 prevent gear 23 from rolling off the front of riser 61 or down ramp 67.

In operation, an aircraft is rolled onto ramp 67, as shown with gear 23 in position A, and then onto surface 65 of riser 61, as in position B. Chock 71 is installed to prevent rollback of gear 23 onto ramp 67. From position B, gear 23 may freely roll onto scale 15, as in position C, for a weight measurement and then back onto surface 65. The aircraft will then be rolled between position B and C for all subsequent measurements. When the measurements are completed, chock 71 is removed, and gear 23 may then be rolled down ramp 67.

Figure 10:
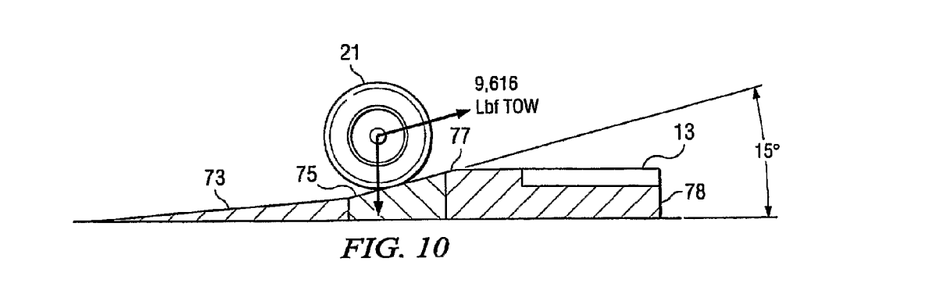
FIG. 10 is a side view of an alternative embodiment of an apparatus according to the present invention.

One limitation of using scale configurations having ramps, such as those described above, is that the aircraft must be towed up the ramps. When towing up the ramps, the towing force may exceed the maximum allowable force on various components. For example, the EH101 has a towing load limit for the nose gear and main gear of 5440 lbs., and the aircraft is designed so that it is not damaged or bent at 1.125 the limit, such as with the use of a shear pin that fails prior to reaching the limit. FIG. 10 shows the configuration when using a standard Intercomp ramp 73, with a length of 73 in. and a height of 4 in., together with a transition ramp 75, which has a length of 24 in. and a height that increases from 4 in. at the rear to 10.2 in. at the front. This height allows transition ramp to reach the height of a landing 77 of a riser 78, on which scale 13 is located. Riser has a total height of 11.2 in., and landing 77 provides a 1 in. angled transition from ramp 75. The angle of the upper surface of transition ramp 75 is approximately 15°, and when this angle is used to calculate towing force for the aircraft weight of 33,187 lbs., the approximate towing force required to move the aircraft up ramp 75 is 9,616 lbs. This exceeds the force allowed for the gear of an EH 101.

Figure 11:
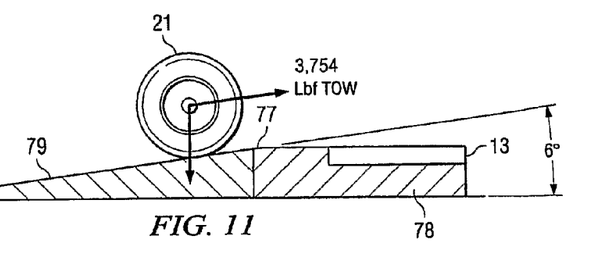
FIG. 11 is a side view of the apparatus of FIG. 10 with an additional component installed.

FIG. 11 shows a configuration like that shown in FIG. 10, but with a transition ramp 79 replacing ramps 73, 75 for decreasing the angle gear 21 takes to move onto riser 78. Transition ramp 79 has a length of 97 in. and a height of approximately 10.2 in., which provides a continuous, reduced angle of approximately 6° from the rear end of ramp 79 to the forward end at landing 77 of riser 78. When ramp 79 is installed, the towing force for an aircraft weighing 33,187 lbs. is reduced to approximately 3,754 lbs., which is well below the limit for an EH 101.

To eliminate the need for ramps and provide for greatly reduced towing force, the present invention also provides for apparatus capable of lifting the landing gear to the level of the scales. Several embodiments of the apparatus are shown in FIGS. 12 through 21.

Figure 12:
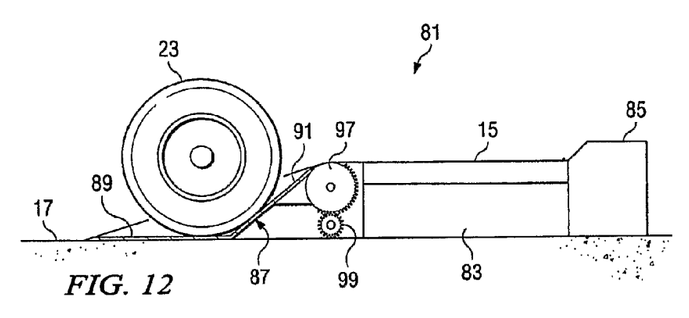
FIG. 12 is a side view of an apparatus according to the present invention.
Figure 13:
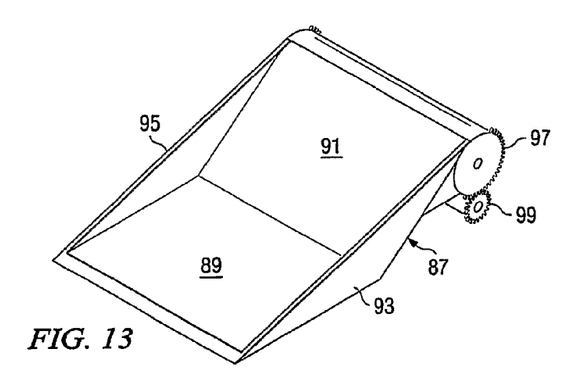
FIG. 13 is an oblique view of a portion of the apparatus of FIG. 12.
Figure 14:
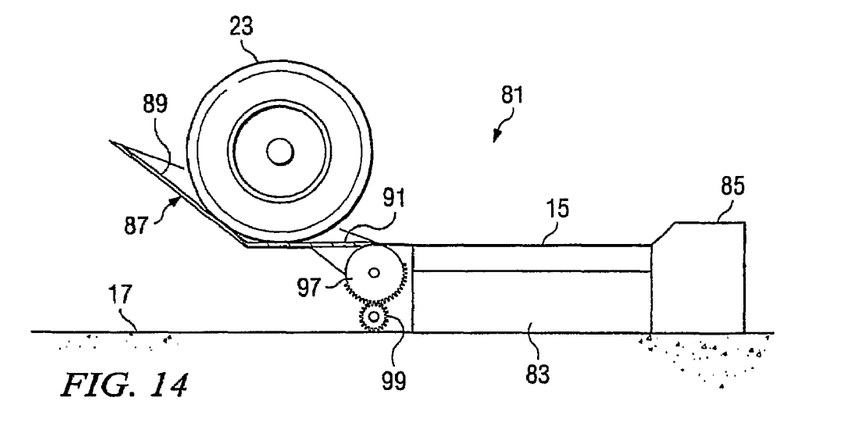
FIG. 14 is a side view of the apparatus of FIG. 12, the apparatus being shown in operation.
Figure 15:
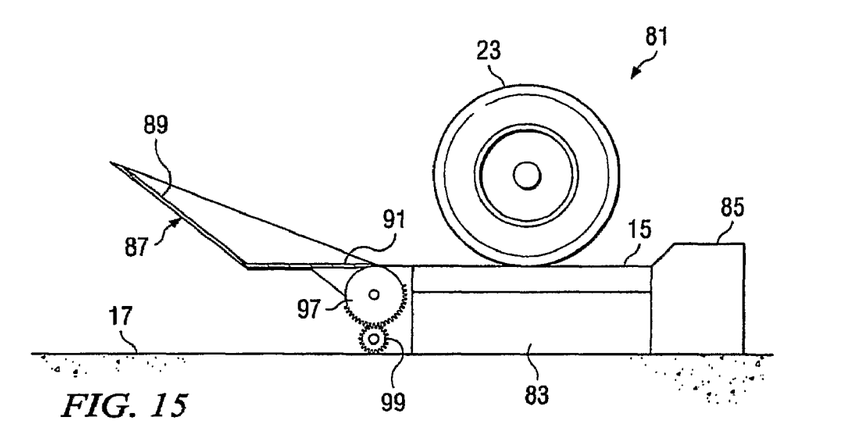
FIG. 15 is a side view of the apparatus of FIG. 12, the apparatus being shown in operation.

FIGS. 12 through 15 illustrate a scale assembly 81, comprising a scale 15, riser 83, chock 85, and movable ramp 87. Scale 15 rests on riser 83, and chock 85 is located forward of scale 15 to prevent gear 23 from rolling forward and off of scale 15. To lift gear 23 from floor 17 to the height of the upper surface of scale 15, ramp 87 is provided with a drive mechanism that rotates ramp 87 between a loading position, which is shown in FIGS. 12 and 13, and a weighing position, which is shown in FIGS. 14 and 15. Ramp 87 is formed to have a "scoop" configuration, wherein first and second rectangular plates are rigidly joined at an angle by sides 93, 95. Ramp 87 is rigidly joined to a drive mechanism, which may consist of, for example, a first gear 97 rigidly connected to ramp 87 and driven in rotation by a second gear 99, which is driven, for example, by an electric motor. In the loading position, plate 89 is oriented as adjacent and parallel floor 17. In the weighing position, plate 91 is oriented to be parallel to the upper surface of scale 15, and plate 89 is angled upward to act as a rear chock.

In operation, an aircraft is moved near scale assembly 81, so that gear 23 is located on plate 89 of ramp 87, as shown in FIG. 12. The drive mechanism is then operated to rotate ramp 87 upward until plate 91 is parallel to the upper surface of scale 15, as shown in FIG. 14, which positions gear 23 for rolling onto scale 15, which is shown in FIG. 15. To remove the aircraft from the scales for a repeat measurement, gear 23 may be rolled back onto plate 91 of ramp 87, and then the aircraft may be rolled back onto scale 15.

Figure 16:
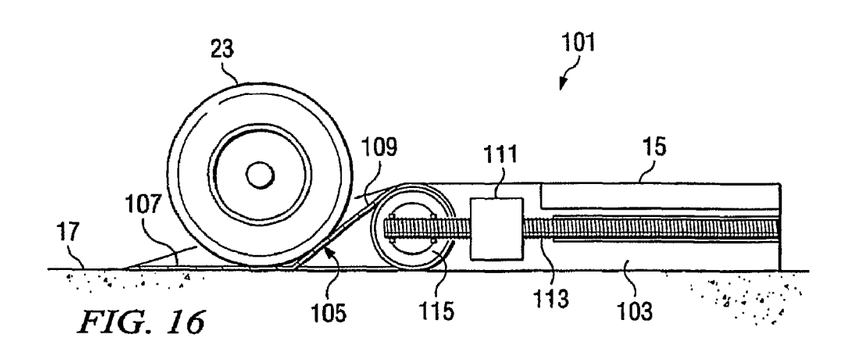
FIG. 16 is a side view of an alternative embodiment of an apparatus according to the present invention.
Figure 17:
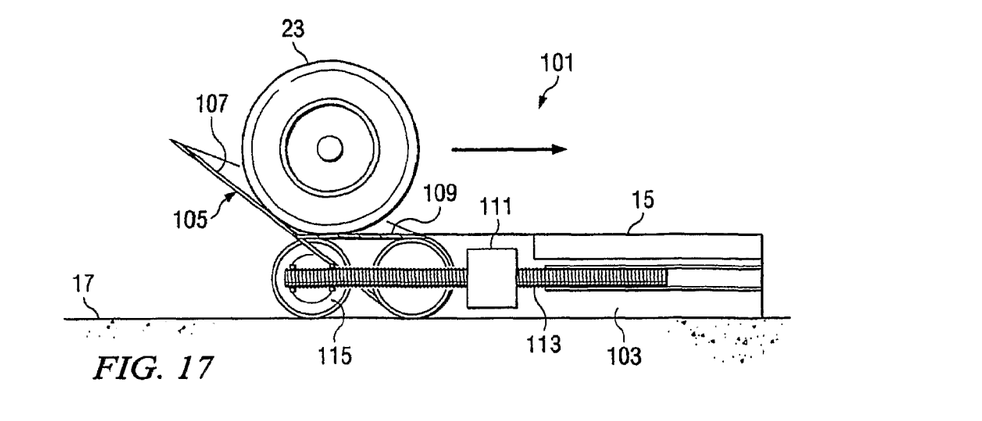
FIG. 17 is a side view of the apparatus of FIG. 16, the apparatus being shown in operation.

An alternative apparatus for lifting landing gear is shown in FIGS. 16 and 17. Scale assembly 101 comprises scale 15, riser 103, and movable ramp 105. Ramp 105 is constructed similarly to ramp 87, with plate 107 being parallel to floor 17 when ramp 105 is in the loading position of FIG. 16, and plate 109 being parallel to the upper surface of riser 103 and scale 15 when ramp 107 is in the weighing position of FIG. 17. To move ramp 107 between the positions, a motor 111 rotates a jackscrew 113, which in turn moves a roller 115 forward and rearward relative to riser 103. As roller 115 moves rearward and further beneath plate 109 of ramp 107, roller 115 bears against the lower side of plate 109 and forces ramp 107 to move upward, lifting gear 23 and the aircraft.

Figure 18:
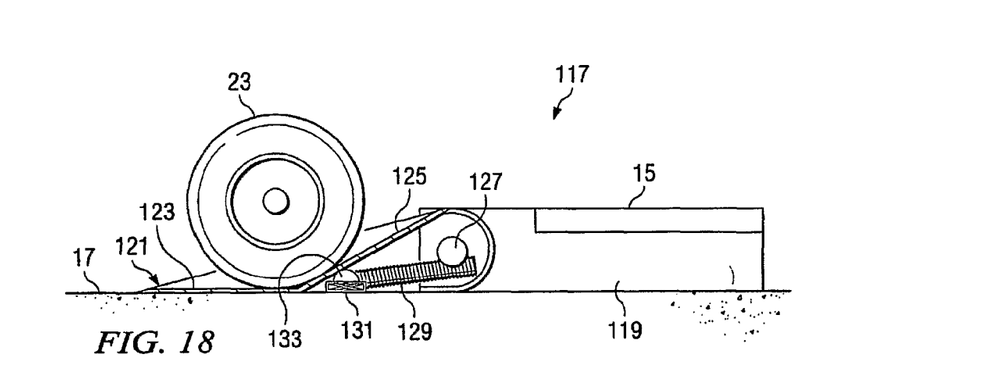
FIG. 18 is a side view of an alternative embodiment of an apparatus according to the present invention.
Figure 19:
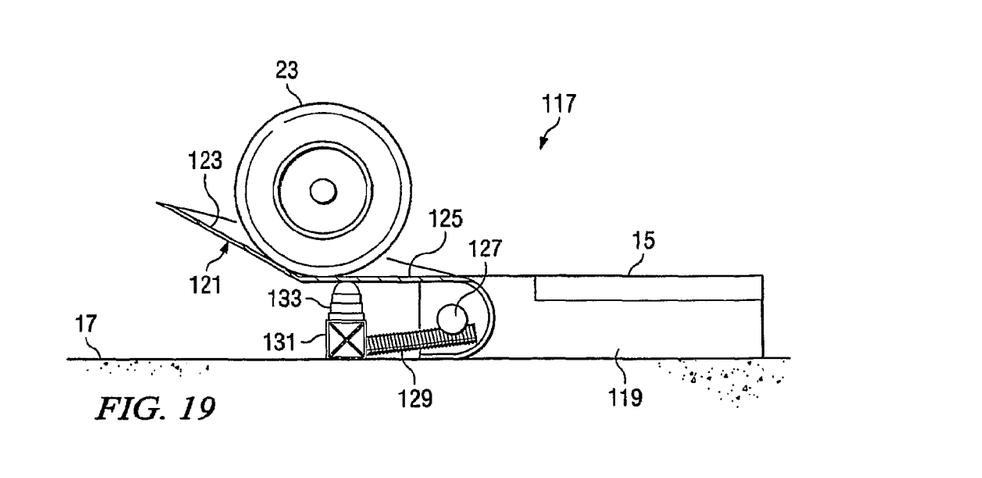
FIG. 19 is a side view of the apparatus of FIG. 18, the apparatus being shown in operation.

Another alternative embodiment of the invention is shown in FIGS. 18 and 19. Scale assembly 117 comprises scale 15, riser 119, and movable ramp 121. Ramp 121 is constructed similarly to ramp 87, with plate 123 being parallel to floor 17 when ramp 121 is in the loading position of FIG. 18, and plate 125 being parallel to the upper surface of riser 119 and scale 15 when ramp 121 is in the weighing position of FIG. 19. To move ramp 121 between the positions, a motor 127 rotates a jackscrew 129, which in turn operates a scissors jack 131. Jack 131 has an extendable portion 133 that bears against the lower side of plate 125, and as jack 131 is operated, portion 133 extends and forces ramp 121 to move upward, lifting gear 23 and the aircraft. Alternatively, jack 131 may be a hydraulic jack.

Figure 20:
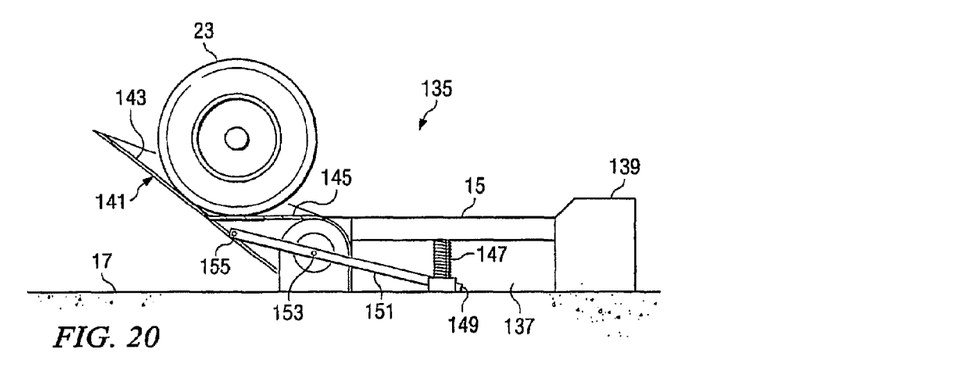
FIG. 20 is a side view of an alternative embodiment of an apparatus according to the present invention, the apparatus being shown in a first position.
Figure 21:
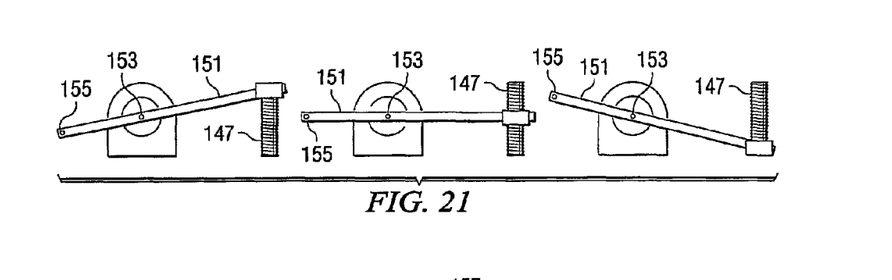
FIG. 21 is a set of side views of a portion of the apparatus of FIG. 20, the portion being shown in various positions.
Figure 22:
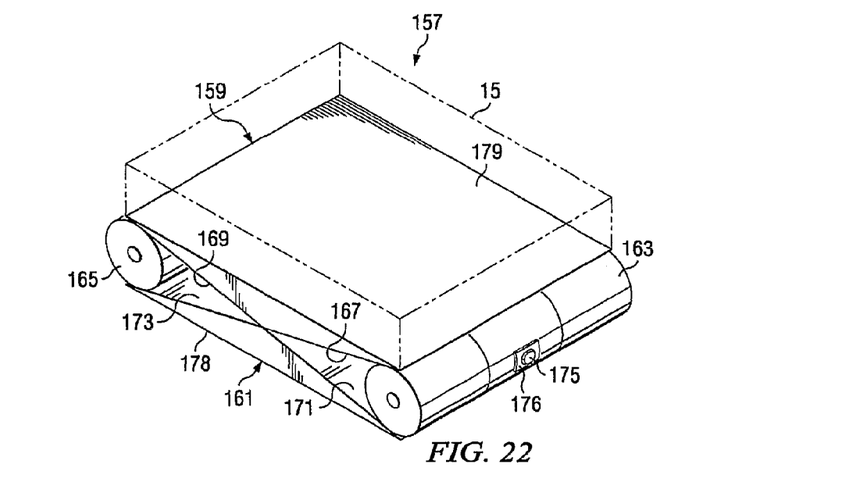
FIG. 22 is an oblique view of an alternative embodiment of an apparatus according to the present invention.
Figure 23:
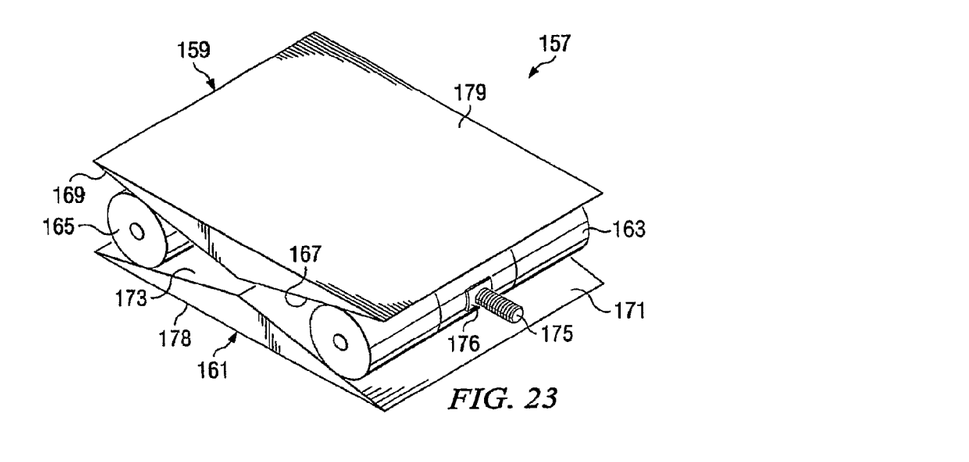
FIG. 23 is an oblique view of the apparatus of FIG. 22, the apparatus being shown in operation.
Figure 24:
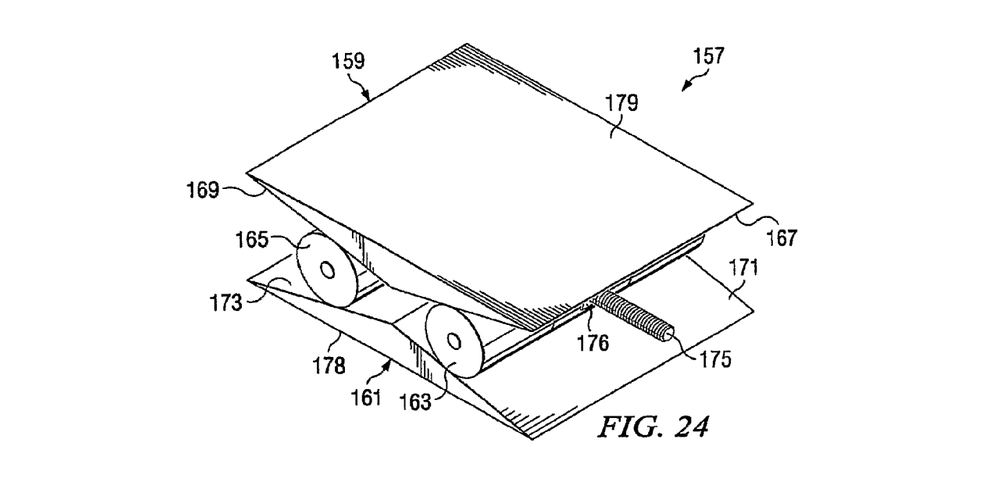
FIG. 24 is an oblique view of the apparatus of FIG. 22, the apparatus being shown in operation.

An additional alternative embodiment of the invention is shown in FIG. 20. Scale assembly 135 comprises scale 15, riser 137, chock 139, and movable ramp 141. Ramp 141 is constructed similarly to ramp 87, with plate 143 being parallel to floor 17 when ramp 141 is in the loading position (not shown), and plate 145 being parallel to the upper surface of riser 137 and scale 15 when ramp 141 is in the weighing position of FIG. 20. To move ramp 141 between the positions, a motor within riser 137 rotates a jackscrew 147, which is threadingly engaged with a forward end 149 of a lever 151. Lever 151 rotates about a pivot 153, such that forward end 149 of lever 151 moves in opposition to a rearward end 155 of lever 151, as shown in FIG. 21. Rearward end 155 is pivotally connected to ramp 141, so that ramp 141 moves with rearward end 155 for lifting gear 23 and the aircraft.

As described above, use of risers with scales 13, 15 may only put the aircraft in an approximately level attitude, wherein a front-to-rear or side-to-side error exists. One method for fine leveling of the aircraft is to roll the aircraft off scales 13, 15 and add or remove shims. Preferably, this will be done with scales 15 only. Another method of fine leveling is available with use of airbag-type risers, in which the height of each riser can be adjusted to the required height to achieve a level attitude.

Figure 25:
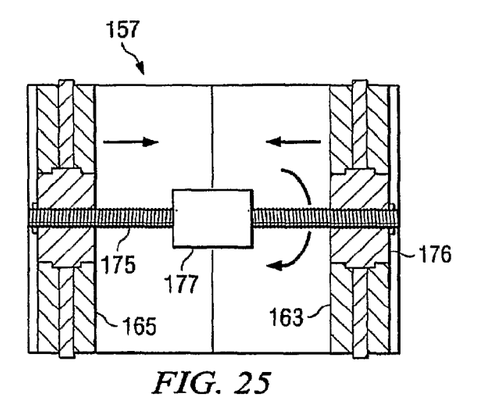
FIG. 25 is a top cross-section view of the apparatus of FIG. 22.
Figure 26:
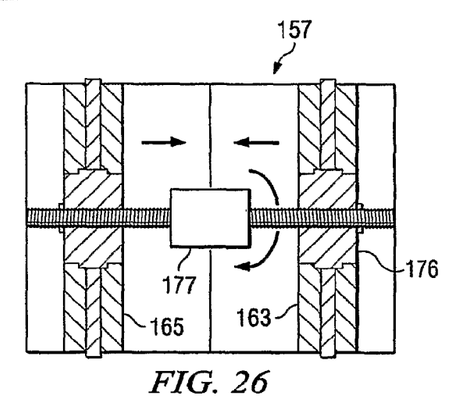
FIG. 26 is a top cross-section view of the apparatus of FIG. 22, the apparatus being shown in operation.

The present invention also provides two additional apparatus providing for fine leveling. FIGS. 22 through 26 show an adjustable riser 157 that can be used as a replacement, for example, for risers 19 and 45. In addition, riser 157 can be incorporated in several of the embodiments of the invention. Riser 157 comprises upper and lower blocks 159, 161 and two rollers 163, 165. Each block 159, 161 has a triangular longitudinal cross-section, such that a pair of angled surfaces 167, 169 and 171, 173, respectively, is formed on each block 159, 161. Surfaces 167, 169 of upper block 159 are aligned with and face in opposition surfaces 171, 173 of lower block 161. Forward roller 163 simultaneously bears against surfaces 167 and 171, and rearward roller 165 simultaneously bears against surfaces 169 and 173. A jackscrew 175 threadingly engages a nut portion 176 of each roller 163, 165 for moving rollers 163, 165 forward and rearward, and this causes rollers 163, 165 to move upper block 159 vertically relative to lower block 161. A motor 177, which is shown in FIGS. 25 and 26, rotates jackscrew 175. A lower surface 178 of lower block 161 reacts against a support surface, and an upper surface 179 of upper block 159 bears against a scale, such as scale 15 shown in phantom in FIG. 22. In this manner, jackscrews 175 can be selectively rotated to cause rollers 163, 165 to move in and out and thereby adjust the height of riser 157.

Figure 27:
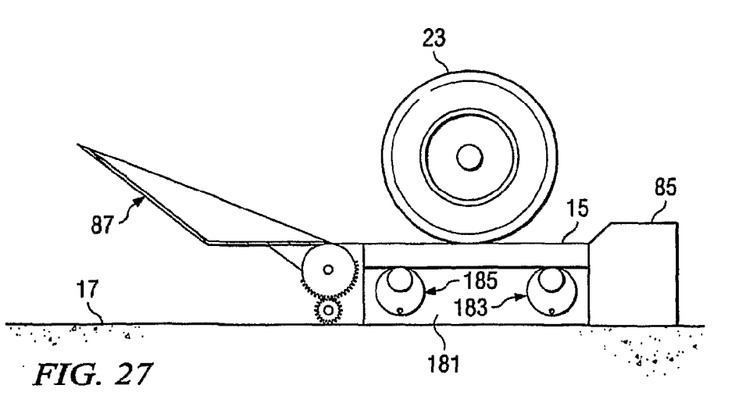
FIG. 27 is a side view of an alternative embodiment of an apparatus according to the present invention.
Figure 28:
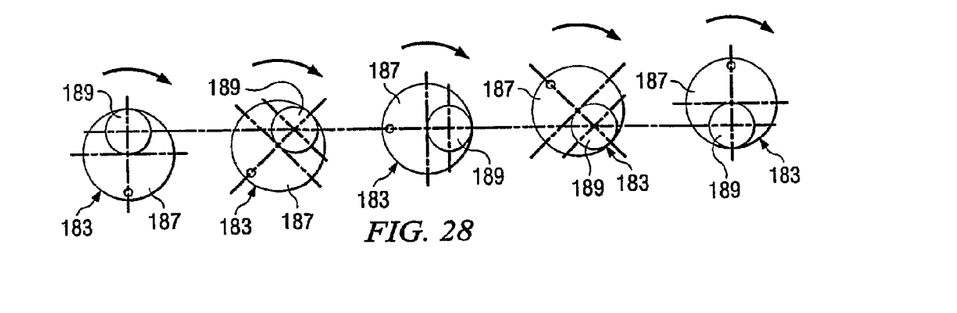
FIG. 28 is a side view of a portion of the apparatus of FIG. 27, the portion of the apparatus being shown in various positions.

An alternative embodiment of an adjustable riser is shown in FIGS. 27 and 28. Riser 181 is shown in a scale assembly like assembly 81, which is described above. Riser 181 may be configured to be a direct replacement for riser 83. To provide for height adjustability of riser 181, two eccentric lobes 183, 185 are installed within an upper portion of riser 181. Lobe 183, which is constructed similarly to lobe 185, is shown in detail in FIG. 28. Lobes 183, 185 comprise eccentric portion 187 and drive member 189. Drive member 189 rotates about its longitudinal axis and is installed in an off-center position within eccentric portion 187. Eccentric portion 187 rotates with drive member 189, and the result is that eccentric portion "wobbles" as drive member rotates the assembly. The eccentric motion causes scale 15, which rests on lobes 183, 185, to move up and down with the motion of lobes 183, 185, allowing a user to selectively adjust the height of scale 15.

The present invention provides for several advantages, including: (1) providing apparatus that allows the user to simultaneously level and weigh an aircraft; (2) providing mobile apparatus to eliminate the need for a dedicated site; and (3) providing improved methods for leveling and weighing an aircraft.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A combination apparatus for weighing an aircraft, the apparatus comprising:
   a plurality of weight scales, each scale having an upper surface and adapted to be supported by a support surface in a position for receiving landing gear of an aircraft thereon; and
   at least one portable riser for supporting one of the scales, each portable riser having an upper surface and being moveable for selected placement on the support surface;
   wherein a height of each riser is selected to position an aircraft on the scales in a level attitude while a weight of the aircraft is being supported by the landing gear on the scales; and
   wherein the upper surface of each scale is sized to receive the landing gear such that no portion of the landing gear rests on the upper surface of the portable riser while the aircraft is being weighed.

2. The apparatus according to claim 1, wherein at least one scale is at least partially recessed in the support surface.

3. The apparatus according to claim 2, wherein an upper surface of the recessed scale is flush with the support surface.

4. The apparatus according to claim 1, wherein the upper surface of the at least one portable riser is flush with the upper surface of the at least one scale supported thereon, the upper surface of the at least one portable riser being sized for supporting the landing gear so that no portion of the landing gear rests on the upper surface of the corresponding scale while the aircraft is not being weighed.

5. A combination weight scale and lifting apparatus, comprising:
   a weight scale having an upper surface;
   a portable riser for supporting one of the scales, the portable riser being moveable for selective placement on a support surface; and
   a lifting device coupled to the portable riser;
   wherein the lifting device is adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale; and
   wherein the upper surface of each scale is sized to receive the landing gear such that no portion of the landing gear rests on the lifting device while the aircraft is being weighed.

6. A combination weight scale and lifting apparatus, comprising:
   a weight scale having an upper surface;
   a portable riser for supporting one of the scales, the portable riser being moveable for selective placement on a support surface; and
   a lifting device coupled to the portable riser;
   wherein the lifting device is adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale; and
   wherein the lifting device is driven between the loading and weighing positions by a gear mechanism.

7. A combination weight scale and lifting apparatus, comprising:
   a weight scale having an upper surface;
   a portable riser for supporting one of the scales, the portable riser being moveable for selective placement on a support surface; and
   a lifting device coupled to the portable riser;
   wherein the lifting device is adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale; and
   wherein the lifting device is driven between the loading and weighing positions by hydraulic pressure means.

8. A combination weight scale and lifting apparatus, comprising:
   a weight scale having an upper surface; and
   a lifting device adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale;
   wherein the lifting device is driven between the loading and weighing positions by a roller means; and
   wherein the upper surface of each scale is sized to receive the landing gear such that no portion of the landing gear rests on the lifting device while the aircraft is being weighed.

9. A combination weight scale and lifting apparatus, comprising:
   a weight scale having an upper surface; and
   a lifting device adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale;
   wherein the lifting device is driven between the loading and weighing positions by scissor jack means.

10. The apparatus according to claim 5, wherein the lifting device is driven between the loading and weighing positions by lever means.

11. A combination weight scale and lifting apparatus, comprising:
   a weight scale having an upper surface;
   a lifting device adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale; and
   a ramp coupled to the lifting device, the ramp having at least two plates that form an angle, a first plate being generally parallel to adjacent the support surface when the lifting device is in the loading position, a second plate being generally parallel to and generally aligned with the upper surface of the scale when the lifting device is in the weighing position.

12. A combination weight scale and lifting apparatus, comprising:
   a weight scale having an upper surface;
   a lifting device adapted for lifting an object to be weighed on the scale, the lifting device being capable of movement between a loading position, in which the object is located below the upper surface of the scale, to a weighing position, in which the object is located in a position generally aligned with the upper surface of the scale, which allows for the object to be moved generally horizontally from the lifting device and onto the upper surface of the scale; and
   a ramp coupled to the lifting device, the ramp having at least two plates that form an angle, a first plate being generally parallel to adjacent the support surface when the lifting device is in the loading position, a second plate being generally parallel to and generally aligned with the upper surface of the scale when the lifting device is in the weighing position;
   wherein the ramp rotates between the loading and weighing positions.

13. A combination weight scale and leveling apparatus, comprising:
   a weight scale having an upper surface; and
   an adjustable portable riser having an upper surface, the riser having a height that is adjustable through height adjusting means, the portable riser being configured for supporting the scale;
   wherein each portable riser is moveable for selected placement on a support surface; and
   wherein the upper surface of each scale is sized to receive an object to be weighed such that no portion of the object rests on the upper surface of the portable riser while the object is being weighed.

14. A combination weight scale and leveling apparatus, comprising:
   a weight scale; and
   an adjustable riser, the riser having a height that is adjustable through height adjusting means, the riser supporting the scale above a support surface;
   wherein the height adjusting means comprises rollers bearing on opposing angled surfaces.

15. A combination weight scale and leveling apparatus, comprising:
   a weight scale; and
   an adjustable riser, the riser having a height that is adjustable through height adjusting means, the riser supporting the scale above a support surface;
   wherein the height adjusting means comprises at least one rotatable eccentric lobe.

16. A combination weight scale and leveling apparatus, comprising:
   a weight scale; and
   an adjustable portable riser, the riser having a height that is adjustable through height adjusting means, the portable riser being configured for supporting the scale;
   wherein each portable riser is moveable for selected placement on a support surface; and
   wherein the height adjusting means comprises at least one airbag.

17. A method for weighing an aircraft, the method comprising:
   (a) positioning a plurality of weight scales so that each landing gear of an aircraft will rest on one of the scales when the aircraft is positioned on the scales;
   (b) positioning at least one portable riser under at least one of the scales for orienting the aircraft in a level attitude when the aircraft is positioned on the scales; and
   (c) positioning an aircraft on the scales and reading the weight measurement from the scales;
   wherein the at least one portable riser is configured for supporting the at least one of the scales, the at least one portable riser being moveable for selected placement on a support surface.

18. The method according to claim 17, step (b) further comprising: adjusting a height of the at least one riser using height adjustment means of the at least one riser.

19. A system for weighing an aircraft having a nose landing gear and a main landing gear, the system comprising:
   a first scale for receiving the nose landing gear;
   a second scale for receiving the main landing gear; and
   a portable riser configured for leveling the aircraft such that a zero attitude level is achieved, the portable riser adapted for carrying the second scale;
   wherein the portable riser is moveable for selected placement on a support surface; and
   wherein the first and second scales are configured for measuring the weight of the aircraft.

20. The system according to claim 19, wherein the first scale is at least partially recessed in the support surface.

21. The system according to claim 20, wherein an upper surface of the first scale is flush with the support surface.

22. A system for weighing an aircraft having a nose landing gear and a main landing gear, the system comprising:
    a first scale for receiving the nose landing gear;
    a second scale for receiving the main landing gear; and
    a portable riser configured for leveling the aircraft such that a zero attitude level is achieved, the portable riser being moveable for selected placement on a support surface;
    wherein the first and second scales are configured for measuring the weight of the aircraft; and
    wherein the portable riser is configured for carrying the first scale.

23. The system according to claim 19, wherein the portable riser has a height that is adjustable through height adjusting means.

24. The system according to claim 19, further comprising:
    a lifting device configured for lifting the main landing gear onto the first scale.

25. The system according to claim 24, wherein the lifting device is coupled to the portable riser.

* * * * *